(No Model.)
C. G. PETHERBRIDGE.
HOSE REEL.
No. 537,713. Patented Apr. 16, 1895.
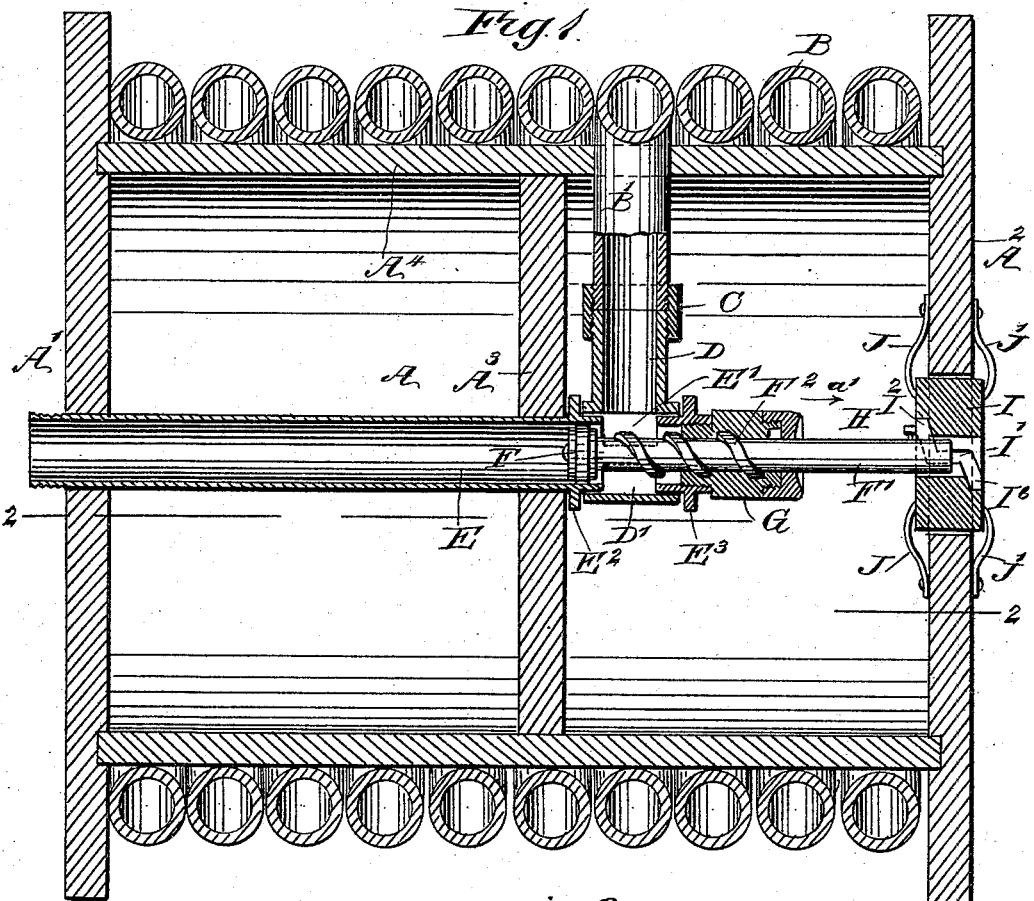
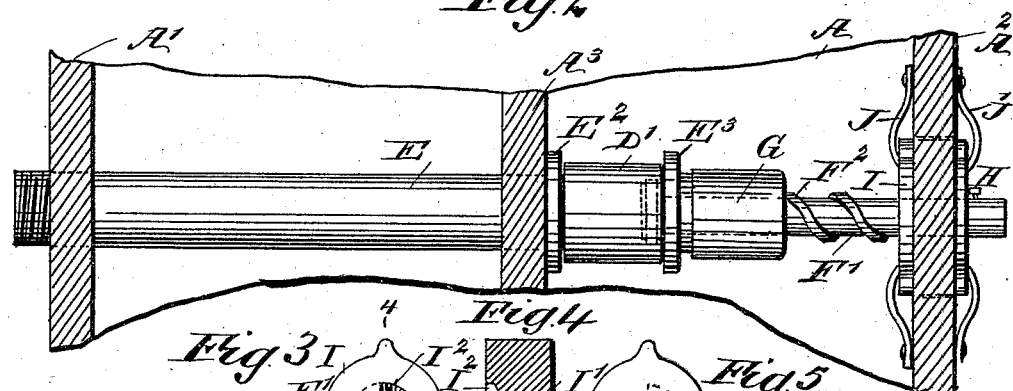
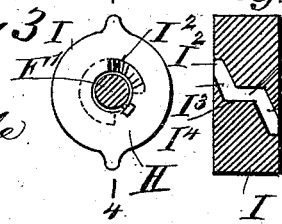
WITNESSES:
F. McArdle
C. Sedgwick
INVENTOR
C. G. Petherbridge
BY
Munn & Co
ATTORNEYS.

UNITED STATES PATENT OFFICE.

CLIFTON GILES PETHERBRIDGE, OF RICO, COLORADO.

HOSE-REEL.

SPECIFICATION forming part of Letters Patent No. 537,713, dated April 16, 1895.

Application filed December 7, 1893. Serial No. 493,027. (No model.)

*To all whom it may concern:*

Be it known that I, CLIFTON GILES PETHERBRIDGE, of Rico, in the county of Dolores and State of Colorado, have invented a new and Improved Hose-Reel, of which the following is a full, clear, and exact description.

The object of the invention is to provide a new and improved hose reel, which is simple and durable in construction, very effective in operation, and arranged in such a manner that the hose is always attached to a water supply, and by unreeling the hose the water is automatically turned on so that in case of a fire for instance, considerable valuable time is saved.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is an inverted sectional plan view of part of the same, on the line 2—2 of Fig. 1. Fig. 3 is an inner face view of the cam for turning the valve stem, the latter being shown in section. Fig. 4 is a sectional side elevation of the same, on the line 4—4 of Fig. 3; and Fig. 5 is an outer face view of the same.

The improved hose reel is provided with a reel proper A having the heads $A'$ and $A^2$ and a transverse partition $A^3$, supporting with the said heads the rim $A^4$, on which the hose B is wound. The inner end $B'$ of the hose B extends through an aperture in the rim $A^4$ to the interior of the reel, as plainly shown in Fig. 1, and this end $B'$ is connected by a coupling C, with the vertical member of a T pipe D, mounted to turn with its horizontal part $D'$ on the inner end $E'$ of the water supply pipe E, extending centrally through the partition $A^3$ and the head $A'$ to connect at its outer end with a suitable water supply. As the pipe E is stationary the reel A is free to revolve on the said pipe, and the inner end $E'$ of the pipe is formed with two ports, so that the pipe D in revolving is always in communication with one of the said ports.

The horizontal portion $D'$ of the T pipe D operates between two annular flanges $E^2$ and $E^3$, and in order to connect the pipe E with and to disconnect it from, the pipe D, I provide a valve F mounted to slide longitudinally in the said inner end of the pipe E to connect the latter by its ports with the pipe D or to disconnect the same. The valve F is provided with a longitudinally-extending valve stem $F'$ on which is formed the screw thread $F^2$ screwing in a nut G, forming a plug for the extreme inner end of the pipe E. Near the outer end of the stem $F'$ is held a friction roller H adapted to engage a cam groove $I'$ formed in a cam I held yieldingly in the head $A^2$ of the reel A, the said cam revolving with the reel but being free to yield longitudinally, the cam being normally held in place by sets of springs J and $J'$, attached to the inner and outer faces of the head $A^2$. The cam groove $I'$ is formed at its inner end with an entrance $I^2$ slightly beveled and leading to an inclined groove $I^3$ terminating in a horizontal part $I^4$, from which extends the inclined portion $I^5$ parallel to the groove $I^3$ and terminating in the exit $I^6$ likewise beveled similar to the entrance $I^2$. The latter is diametrically opposite the exit $I^6$, as will be readily understood by reference to Figs. 3 and 5.

The cam I is held to yield longitudinally in the head $A^2$, so as to permit the roller H to readily pass into the entrance and exit portions of the groove $I'$, whenever the reel is turned to wind and unwind the hose B, as hereinafter more fully explained.

When the several parts are in the position shown in Fig. 1, the hose B is wound on the reel and the valve F is in its innermost position within the pipe E, so that water is shut off from the pipe $B'$. Now when the reel is turned in the direction to unwind the hose therefrom, the roller H of the valve stem F, will owing to the yielding nature of the cam I, enter the beveled portion $I^2$ of the said cam and pass down the inclined groove $I^3$ without revolving the valve stem $F'$, but as soon as the roller H enters the horizontal portion $I^4$ of the cam, the valve stem will be revolved with the cam and the thread of the stem engaging the screw G, the said stem will be moved endwise in the direction of the arrow $a'$ and will continue to so move until the roller H has moved out of the horizontal portion $I^4$ of the cam, at which time the valve F will have been moved out of the end of the pipe E and water admitted to the hose B through the pipe $B'$. As soon as the roller H leaves the horizontal portion $I^4$ of the cam, the valve stem ceases to revolve, and as the reel continues to revolve the cam I being free to move longitudinally, moves inwardly and the roller H travels down the incline portion $I^5$ and out through the inclined exit $I^6$ and the reel can be continued to be revolved to unwind the hose without affecting the movement of the valve. The roller H after passing through the exit $I^6$ and to the position shown in Fig. 2, will as long as the reel is turned to unwind the hose travel on the outer face of the cam without entering the cam groove $I'$. Now when the reel is turned in the opposite direction to wind up the hose B, the roller H will enter the inclined exit $I^6$ on the outer face of the cam and the cam being yieldingly held, moves outward and causes the said roller to travel down the incline portion $I^5$ without moving the valve stem, but as soon as the roller H enters the horizontal portion $I^4$, the stem $F'$ will be revolved and the valve F moved in the inverse direction of the arrow $a'$ and the said stem will continue to so move as long as the roller remains in the said horizontal portion, but by the time it reaches the incline groove $I^3$, the valve F will have entered the pipe E and cut off the water. The continued revolution of the reel will, owing to the yielding of the cam, cause the roller to travel down the said incline groove $I^3$ and out through the beveled portion $I^2$. During the time the roller is passing through the groove $I^3$ and beveled portion $I^2$ and the subsequent revolution of the reel for the purpose of winding the hose after the roller has passed through to the inner surface of the cam, does not affect the valve. The roller after passing to the inner face of the cam will travel around the same without entering the cam groove thereof, so long as the reel is turned in the direction to wind up the hose.

Having thus fully described my invention, I claim as new and desire to secure by Letters Patent—

1. The combination with a reel, a pipe upon which the reel is mounted adapted to be connected with a source of water supply, and a coupling for connecting the hose wound on the reel with the said pipe, of a valve in the said pipe for opening and closing the same, and provided with a threaded valve stem, a nut in which the valve stem works, and a cam, yieldingly mounted in one head of the reel and with which the valve stem engages, substantially as described.

2. The combination with a water supply pipe, a reel mounted thereon, and a coupling for connecting a hose wound on the reel with said pipe, of a valve in the pipe and having a threaded stem carrying a projection at its end, a nut in which works the said stem, and a block yieldingly supported in one head of the reel, and provided with a cam groove with which the projection of the valve stem engages, substantially as described.

3. A hose reel, comprising a fixed water supply pipe having a ported end, a reel mounted to turn on the said water supply pipe, a T pipe mounted to turn on the inner ported end of the said water supply pipe and connected with the hose adapted to be wound or unwound on the reel, a valve operating in the ported end of the said supply pipe, the said valve being provided on its valve stem with a screw thread, a nut held on the inner end of the said water supply pipe and in which screws the threaded part of the valve stem, a friction roller held on the said stem, and a block held on the said reel and provided with a cam groove adapted to be engaged by the said friction roller, substantially as shown and described.

4. A hose reel, comprising a fixed water supply pipe having a ported end, a reel mounted to turn on the said water supply pipe, a T pipe mounted to turn on the inner ported end of the said water supply pipe and connected with the hose adapted to be wound or unwound on the reel, a valve operating in the ported end of the said supply pipe, the said valve being provided on its valve stem with a screw thread, a nut held on the inner end of the said water supply pipe and in which screws the threaded part of the valve stem, a friction roller held on the said stem, a block held on the said reel and provided with a cam groove adapted to be engaged by the said friction roller, and springs pressing on the inner and outer faces of the said cam to permit the latter to yield longitudinally, substantially as shown and described.

5. A hose reel provided with a valve having a threaded stem, and a friction roller, a nut in which screws the threaded end of the said stem, and a block having a cam groove, substantially as described, and adapted to be engaged by the said friction roller on the valve stem, as set forth.

CLIFTON GILES PETHERBRIDGE.

Witnesses:
CHARLES DOUGLASS STEWART,
JOSEPH SHONE.